(12) United States Patent
Zhang et al.

(10) Patent No.: US 9,474,093 B2
(45) Date of Patent: Oct. 18, 2016

(54) CORRELATION OF COMMUNICATION DEVICES AND SUBSCRIBER INFORMATION

(71) Applicant: Time Warner Cable Enterprises LLC, New York, NY (US)

(72) Inventors: Qiang Zhang, Fairfax, VA (US); Arun Manroa, Herndon, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 103 days.

(21) Appl. No.: 14/245,166

(22) Filed: Apr. 4, 2014

(65) Prior Publication Data

US 2015/0289300 A1   Oct. 8, 2015

(51) Int. Cl.
*H04W 76/02* (2009.01)
*H04W 8/18* (2009.01)

(52) U.S. Cl.
CPC .............. *H04W 76/021* (2013.01); *H04W 8/18* (2013.01)

(58) Field of Classification Search
None
See application file for complete search history.

(56) References Cited

U.S. PATENT DOCUMENTS

| | | | | |
|---|---|---|---|---|
| 2006/0203786 A1* | 9/2006 | Kola | ...................... | H04W 36/08 370/338 |
| 2006/0239254 A1* | 10/2006 | Short | ...................... | H04L 63/08 370/352 |
| 2006/0268902 A1* | 11/2006 | Bonner | .................. | H04L 63/102 370/401 |
| 2007/0008885 A1* | 1/2007 | Bonner | .................... | H04L 63/08 370/230 |
| 2007/0268908 A1* | 11/2007 | Linkola | .................. | H04W 12/08 370/395.2 |
| 2011/0225628 A1* | 9/2011 | Hirose | .................. | G06F 17/243 726/3 |
| 2012/0124612 A1* | 5/2012 | Adimatyam | ..... | H04N 21/25841 725/27 |
| 2013/0227284 A1* | 8/2013 | Pfeffer | ................ | H04L 63/0236 713/168 |
| 2013/0247164 A1* | 9/2013 | Hoggan | ................ | H04W 12/06 726/8 |
| 2014/0050320 A1* | 2/2014 | Choyi | ..................... | H04L 63/08 380/270 |
| 2015/0264051 A1* | 9/2015 | Hoggan | .............. | H04L 63/0892 726/1 |

* cited by examiner

*Primary Examiner* — Robert C Scheibel
(74) *Attorney, Agent, or Firm* — Chapin Intellectual Property Law, LLC

(57) ABSTRACT

A correlator resource processes connectivity information to identify a network address of a wireless access point to which a communication device establishes a connection with a network. The correlator resource utilizes the network address to identify a gateway resource through which the wireless access point has access to the network. The correlator resource utilizes an identity of the gateway resource to identify subscriber information associated with the communication device. Thereafter, the correlator resource produces a record associating the communication device to subscriber account information.

25 Claims, 10 Drawing Sheets

CORRELATION OF COMMUNICATION DEVICES AND SUBSCRIBER INFORMATION

BACKGROUND

One of the major user experience issues for a carrier grade WiFi™ system is that, since the authentication mechanism for WiFi™ is not based on a mobile SIM (Subscriber Identity Module), a new user will need to manually perform multiple operations to sign up for a set of WiFi™ user credentials in order to start using a respective WiFi™ service. This is an undesirable hurdle that a subscriber typically must endure in order to register a mobile device for subsequent use of WiFi™ services.

This issue is most prominent for the carrier WiFi™ service offered by a fixed broadband operator such as a cable MSO (Multiple Service Operators), where the operator doesn't own any of the end user devices. In a typical deployment, the user of the new device needs to start with using an existing broadband account along with personal verification information to sign up/create the credentials to be used with the WiFi™ service. If the user has already obtained the credentials, he/she still has to supply the credentials during at least the first time of accessing a respective network through a wireless access point.

BRIEF DESCRIPTION OF EMBODIMENTS

Embodiments herein deviate with respect to conventional techniques and hurdles of correlating a newly operated communication device with a respective subscriber and/or subscriber account information.

More specifically, in one embodiment, assume that a subscriber operates a communication device for the first time to access a network. In such an instance, a service provider providing the subscriber access to a corresponding network may not yet be aware of the communication device or that it is operated by the subscriber because the communication device is new. As discussed above, requiring a user to manually register a communication device with a service provider is often tedious and therefore undesirable.

In one embodiment, as an alternative to manual registration, a service provider overseeing a network correlates (potentially unbeknownst to the subscriber) a communication device to corresponding subscriber information associated with the subscriber upon detecting use of the communication device by the subscriber. For example, a correlator resource operated by the service provider processes received connectivity information to identify a network address of a wireless access point to which a communication device establishes a connection. The correlator resource utilizes the network address of the wireless access point to identify a gateway resource through which the wireless access point accesses the network. The correlator resource utilizes the network address of the gateway resource to identify subscriber account information associated with the user operating the communication device. The correlator resource then associates the communication device with the identified subscriber account information.

As further described herein, association of the communication device to the subscriber and/or subscriber information enables the service provider to more easily provide useful services to the operator of the communication device. For example, after an identity of a communication device (such as assigned network address information) has been correlated with the subscriber and/or corresponding subscriber account information, the service provider can quickly identify (based on a network address assigned to the communication device) whether the communication device is operated by a corresponding subscriber that should be granted access to a network such as the Internet.

These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware in one or more ROM (Read Only Memory), RAM (Random Access Memory), PROM (Programmable Read Only Memory), etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiment as described herein includes a computer readable storage medium, system, hardware, etc., having instructions stored thereon. The instructions, when executed by computer processor hardware, cause the computer processor hardware of the system to: process connectivity information to identify a network address of a wireless access point to which a communication device establishes a connection with a network; utilize the network address to identify a gateway resource through which the wireless access point has access to the network; and correlate the communication device to subscriber account information based at least in part on an identity of the gateway resource.

Another embodiment as described herein includes computer readable storage medium, system, hardware, etc., having instructions stored thereon. The instructions, when executed by computer processor hardware, cause the computer processor hardware of the system to: obtain network address information assigned to a gateway resource through which an access point provides access to a network; utilize the network address information assigned to the gateway resource to identify subscriber account information; and correlate the subscriber account information to a communication device that communicates through the access point to access the network.

Note that the ordering of the operations can vary. For example, any of the processing operations as discussed herein can be performed in any suitable order.

Other embodiments of the present disclosure include software programs and/or respective hardware to perform any of the method embodiment operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for correlating a newly detected computer device with corresponding subscriber account information of a user operating the computer device. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Figure 1:
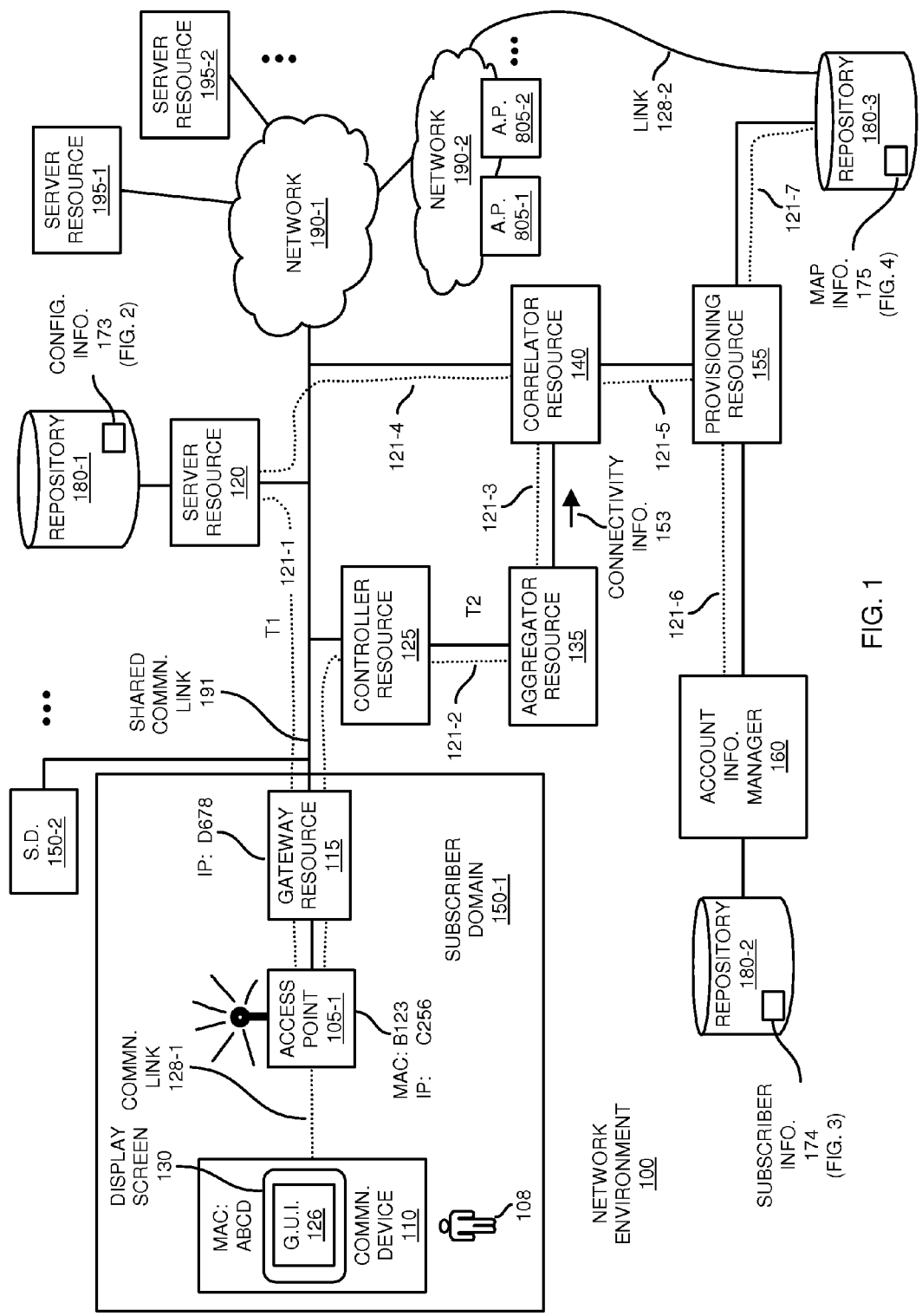
FIG. 1 is an example diagram illustrating correlation of resources in a network environment according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

Now, more specifically, FIG. 1 is an example diagram illustrating a network environment and correlation of resources in a network environment managed by a service provider according to embodiments herein.

As shown, network environment 100 includes subscriber domain 150-1 (such as a household, business, etc.) in which a user 108 such as a subscriber resides. In one non-limiting example embodiment, the user 108 subscribes to a network access plan offered by a corresponding service provider that controls one or more resources in network environment 100. The network access plan provided by the service provider allows the user 108 to access network 190-1 via a respective communication link 128-1 (such as a wireless communication link) with access point 105-1.

More specifically, as shown, access point 105-1 is communicatively coupled to gateway resource 115 such as cable modem provided by the service provider in control of communications over shared communication link 191. Via communications conveyed between the gateway resource 115 to a distribution resource such as a cable modem termination system in network environment 100 (also managed and operated by the service provider), the user 108 is able to operate communication device 110 and communicate through a combination of resources including access point 105-1, gateway resource 115, a cable modem termination system, etc., to access network 190-1 (such as a packet-switched network, Internet, etc.).

In other words, communication device 110 communicates data packets to access point 105-1, access point 105-1 forwards the communications to gateway resource 115, gateway resource 115 forwards the communications over shared communication link 191 to a resource in network 190 such as server resource 195-1.

In a reverse direction, a resource such as server resource 195-1 communicates data packets over network 190-1 to the cable modem termination system; the cable modem termination system forwards the communications to gateway resource 115, gateway resource forwards the communications to access point 105-1, access point 105-1 forwards the communications to communication device 110.

In one embodiment, the user 108 utilizes the communication device 110 to execute an application such as a browser that displays graphical user interface 126 on corresponding display screen 130. Via the browser application and corresponding graphical user interface 126, the user 108 provides input to communication device 110 and is able to retrieve data (such as webpages) from or transmit data to one or more different resources such as server resource 195-1, server resource 195-2, etc.

Communication link 128-1 can be a wired or wireless communication link. In one embodiment, communication link 128-1 is a wireless communication link established in accordance with any suitable wireless protocol. By way of non-limiting example, the communication link 128-1 can be established in accordance with WiFi™ standards including IEEE (Institute of Electrical and Electronics Engineers) standards 802.11a, 802.11b, 802.11g, 802.11n, etc.

As previously discussed, embodiments herein include a way of correlating a newly used communication device 110 operated by user 108 with corresponding subscriber information associated with user 108. For example, as further described herein, during an initial access to a network 190-1 through a private access point 105-1 located in a respective subscriber domain 150-1, the service provider correlates a respective communication device 110 (and MAC network address ABCD) to corresponding subscriber information associated with user 108. In addition to providing a respective user access to the network 190-1 via private access point 105-1 and respective gateway resource 115, the service provider also provides the subscribers (including user 108) access to one or more community access points (such as access point 805-1, 805-2, etc.) provided by the service provider for use by corresponding subscribers to access network 190-1 while outside of their subscriber domains. Subsequent to correlating a respective communication device with subscriber information of the subscriber using the communication device 110, the subscriber (user 108) can operate the communication device 110 to establish a wireless communication link with a community access point 805-1 to access the network 190-1. In such an instance, because the MAC address of the communication device 110 already has been correlated to subscriber information associated with user 108, the service provider can immediately provide the subscriber (user 108) use of any of the community accessible access points 805 to access network 190-1 because it is known that the MAC address of the communication device 110 corresponds to a particular subscriber.

More specifically, network environment 100 also includes network 190-2 such as a wireless core network managed by the service provider. Network 190-2 controls a flow of communications between access point 805-1, access point 805-2, etc., and network 190-1 (such as the Internet). The network 190-2 (wireless core network) manages the applications and provides network routing for any communication devices attempting to communicate through it to network 190-1. In one embodiment, the network 190-2 (wireless core network) communicates over link 128-2 to repository 180-3 to access mapping information 175. The wireless core network 190-2 uses the map information 175 retrieved from the repository 180-3 to auto-authenticate/authorize the communication devices when a respective communication device such as communication device 110 attempts to access network 190-1 through an one of access points 805. For example, as previously discussed, because the MAC address of the communication device 110 already has been correlated to subscriber information associated with user 108 (as indicated by mapping information 175), the service provider can immediately provide the subscriber (user 108) use of any of the community accessible access points 805 to access network 190-1 because it is known that the MAC address of the communication device 110 corresponds to a particular subscriber.

Correlation

As a more specific example, prior to correlation, assume that the user 108 (a subscriber) operates communication device 110 for the first time to access network 190-1 such as the Internet. In such an instance, a corresponding service provider providing the user 108 access to a corresponding network 190-1 may not yet be aware of the communication device 110 because the communication device 110 is new.

Initially, prior to the user 108 using the communication device 110, the user (or other suitable entity) installs the access point 105-1 and gateway resource 115 in subscriber domain 150-1. Prior to use, the server resource 120 (such as a DHCP or Dynamic Host Configuration Protocol server resource) allocates and assigns the wireless access point 105-1 unique network address information. For example, the access point 105-1 is assigned a MAC address of B123. At or around tine T1, via communications 121-1, the access point 105-1 communicates with server resource 120 to obtain an IP network address. In this instance, assume that server resource 120 allocates IP address C256 to access point 105-1.

During an operation of receiving a request for a network address from access point 105-1 and assigning the network address to the access point 105-1, via communications 121-1, the server resource 120 receives notification of network address information (such as IP network address D678) assigned to the gateway resource 115 resource through which the wireless access point 105-1 communicates over shared communication link 191 to the network 190-1.

Server resource 120 generates configuration information 173 for storage in repository 180-1. Via the configuration information 173, the server resource 120 keeps track of an association between the wireless access point 105-1 and the gateway resource 115. As further show in FIG. 2, creating the association includes mapping the network address information of the wireless access point 105-1 (such as network address information MAC network address B123 and IP network address C256) to network address information (such as IP network address D678) assigned to the gateway resource 115.

Thus, for subscriber domain 150-1, server resource 120 produces configuration information 173 to indicate that the access point 105-1 assigned MAC address B123 and IP network address C256 is communicatively coupled to gateway resource 115 assigned IP network address D678 to provide access to network 190-1. Timestamp T1 represents an approximate time that the server resource 120 allocates the respective IP network address C256 to access point 105-1.

In a similar manner, the server resource 120 keeps track of an association between a respective access point and gateway resource in each of multiple different subscriber domains that are part of a service group having access to network 190-1 through shared communication link 191.

Figure 2:
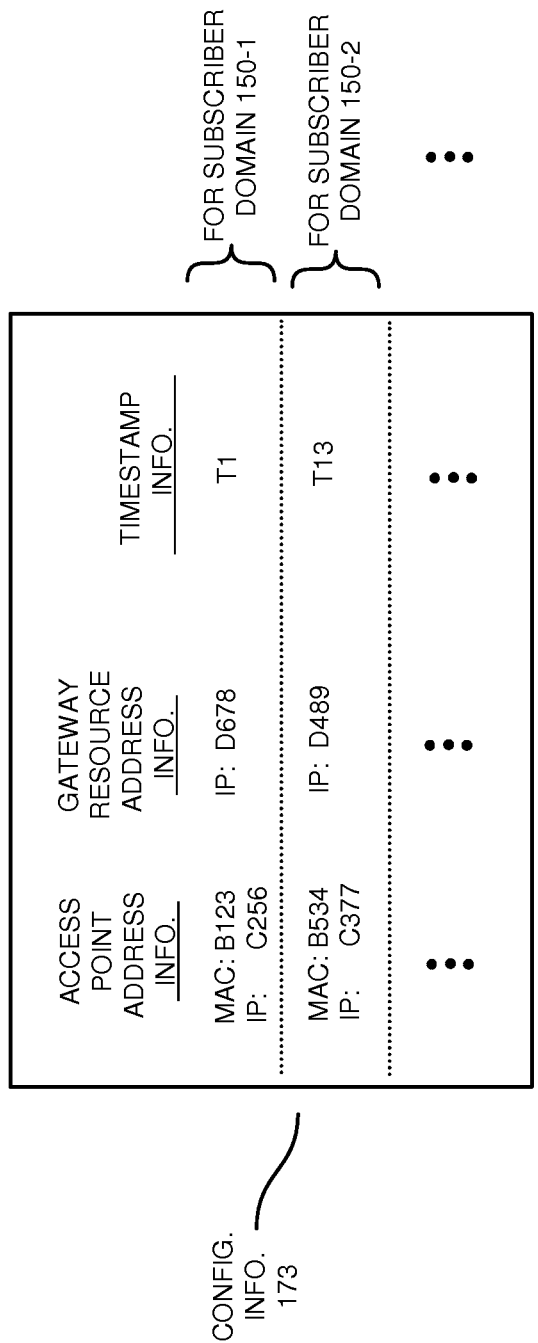
FIG. 2 is an example diagram illustrating configuration information indicating associations between access points and corresponding gateway resources according to embodiments herein.

As further show in the configuration information 173 in FIG. 2, server resource 120 produces configuration information 173 indicating a respective association between an access point and gateway resource in subscriber domain 150-2. In this example embodiment, for subscriber domain 150-2, server resource 120 produces an entry in configuration information 173 to indicate that a respective access point (in subscriber domain 150-2) is assigned MAC address B543 and IP network address C377 and that the corresponding access point in subscriber domain 150-2 is communicatively coupled to a respective gateway resource (in subscriber domain 150-2) assigned IP network address D489 to access network 190-1. Timestamp T13 represents an approximate time that server resource 120 allocates the respective IP network address C377 to access point 105-1.

Referring again to FIG. 1, the service provider offering a network access plan to which the user 108 subscribes automatically correlates (potentially unbeknownst to the subscriber) a communication device 110 to corresponding subscriber information associated with the subscriber upon detecting use of the communication device 110 by the subscriber (user 108).

As further described herein, association of the communication device 110 to corresponding subscriber information enables the service provider to more easily provide useful services to the operator of the communication device 110. For example, after an identity (such as a MAC network address of ABCD) assigned to communication device 110 has been correlated with the user 108 and his corresponding subscriber account information 15523456-12, the service provider can: quickly identify whether the communication device 110 should be granted access to a network such as the Internet, configure a device with configuration information, etc.

An example of auto-provisioning of configuration information to a communication device is further discussed in related application entitled "PROVISIONING OF WIRELESS SECURITY CONFIGURATION INFORMATION IN A WIRELESS NETWORK ENVIRONMENT," (U.S. application Ser. No. 14/245,179), filed on the same day as the present application, the entire teachings of which are incorporated herein by this reference.

Assume further in this example embodiment that the user 108 establishes (potentially for the first time) a communication link 128-1 (at or around time T2, subsequent to time T1 when the access point 105-1 is allocated an IP network address of C256). The communication link 128-1 is established between the communication device 110 (operated by the user 108) and a wireless access point 105-1 and affords the user 108 access to a corresponding network 190-1 such as the Internet.

Subsequent to establishing the communication link 128-1 enabling a respective communication session, the access point 105-1 exports corresponding communication session information (or connectivity information 153) notifying controller resource 125 (such as a WiFi™ controller resource in communication with wireless access point 105-1) of the network access event by user 108 occurring at or around time T2. Note again that time T2 occurs some time after the server resource 120 assigns the access point 105-1 a respective IP network address of C256 at time T1.

In one embodiment, the exported session information or connectivity information 153 (transmitted at or around time T2) from access point 105-1 through gateway resource 115 to controller resource 125 includes information such as a MAC network address (ABCD) assigned to the newly used communication device 110 establishing the communication link 128-1, MAC network address (B123) and IP network address (C256) assigned to the access point 105-1, and time stamp of T1. The connectivity information 153 indicates that the newly used communication device 110 communicates through access point 105-1 and gateway resource 115 to network 190-1.

Assume in this example that the service provider operates correlator resource 140 and provisioning resource 155 (such as a one or more disparately or co-located resources) in a respective network environment 100 to correlate newly detected communication devices to corresponding subscriber information.

Via communications 121-2 from the controller resource 125 to the aggregator resource 135, the aggregator resource 135 (such as a network management system) receives the communication session information as previously discussed and forwards it as connectivity information 153 to correlator resource 140 via communications 121-3. Again, the connectivity information 153 received by correlator resource 140 can include information such as a MAC network address (ABCD) assigned to the newly used communication device 110 establishing the communication link 128-1, MAC network address (B123) and IP network address (C256) assigned to the access point 105-1, and time stamp of T1 indicating when the communication session was established by the communication device 110.

In this example embodiment, the correlator resource 140 (operated by the service provider) processes the received connectivity information 153 to identify network address information (such as MAC network address B123 and/or IP network address C256) assigned to the wireless access point 105-1 to which the communication device 110-1 establishes the communication link 128-1.

Via communications 121-4, the correlator resource 140 utilizes network address information (such as MAC network address B123 and/or IP network address C256) assigned to the wireless access point 105-1 to identify attributes (such as network address information) of a corresponding gateway resource 115 through which the wireless access point has access to the network 190-1. For example, recall that server resource 120 (such as a DHCP or Dynamic Host Configuration Protocol server resource) allocated and assigned the wireless access point 105-1 unique network address information IP network address C256. During such an operation of assigning the network address C256 to the wireless access point 105-1, the server resource 120 receives notification of network address information (IP network address D678) assigned to the gateway resource 115 (such as a modem) through which the wireless access point 105-1 communicates to the network 190-1. As previously discussed, the server resource 120 stores this information as configuration information 173 in repository 180-1.

Via communications 121-4, the correlator resource 140 forwards MAC network address B123 and/or IP network address C256 to server resource 120. Using the configuration information 173, the server resource 120 maps the received network address information to IP network address D678 assigned to gateway resource 115. Server resource 120 forwards the IP network address of D678 (gateway resource 115) to correlator resource 140.

Via communications 121-5, correlator resource 140 forwards a notification to provisioning resource 155. The notification includes a combination of information received via communications 121-3 and 121-4 including MAC network address ABCD of the communication device 110, the IP network address C256 and MAC network address B123 assigned to access point 105-1, and IP network address D678 assigned to the gateway resource 115.

The notification (communications 121-5) to provisioning resource 155 indicates that communication device 110 (assigned MAC network address ABCD) communicates through access point 105-1 (assigned B123 and C256) and gateway resource 115 assigned IP network address D678. Thus, the communications 121-5 indicate that access point 105-1 is communicatively coupled to gateway resource 115.

Provisioning resource 155 uses the notification received from correlator resource 140 to retrieve corresponding subscriber information associated with user 108. For example, in one embodiment, the service provider keeps track of and stores subscriber information 174 in repository 180-2. As further discussed below, via communications 121-6 between the provisioning resource 155 and the account information manager 160, the provisioning resource 155 retrieves subscriber account information associated with user 108 operating the communication device 110.

Figure 3:
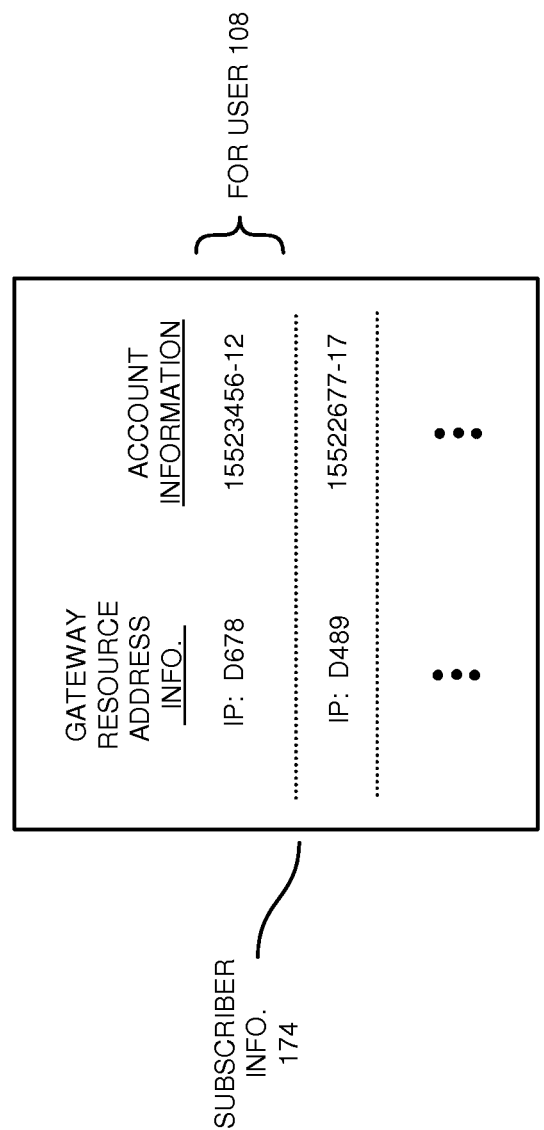
FIG. 3 is an example diagram illustrating subscriber information indicating associations between gateway resources and corresponding subscriber account information according to embodiments herein.

FIG. 3 is an example diagram illustrating subscriber information according to embodiments herein.

As shown, subscriber information 174 includes a mapping of a corresponding gateway resource assigned for use by the subscriber in a respective subscriber domain. In this example embodiment, the service provider has provided gateway resource 115 (assigned IP network address D678) to user 108 for use in subscriber domain 150-1. The user 108 allocated gateway resource 115 is assigned account number 15523456-12.

Referring again to FIG. 1, via communications 121-6, the provisioning resource 155 communicates a query including an identity (such as IP network address D678) to the account information manager 160. Account information manager 160, in turn, utilizes the received IP network address D678 to, via mapping in subscriber information 174, identify account information assigned to the user 108 allocated gateway resource 115 for use. In this example embodiment, the account information manager 160 uses the subscriber information 174 to map the received IP network address D678 (of gateway resource 115) to subscriber account information 15523456-12 associated with user 108. The account information manager 160 forwards the account information 15523456-12 to provisioning resource 155.

Via communications 121-7, the provisioning resource 155 then initiates creation of correlation information mapping the newly detected communication device 110 (MAC network address ABCD) to the subscriber account information (15523456-12). For example, provisioning resource 155 initiates storage of the received IP network address D678 and account information 15523456-12 as an entry associated with user 108 in map information 175.

Figure 4:
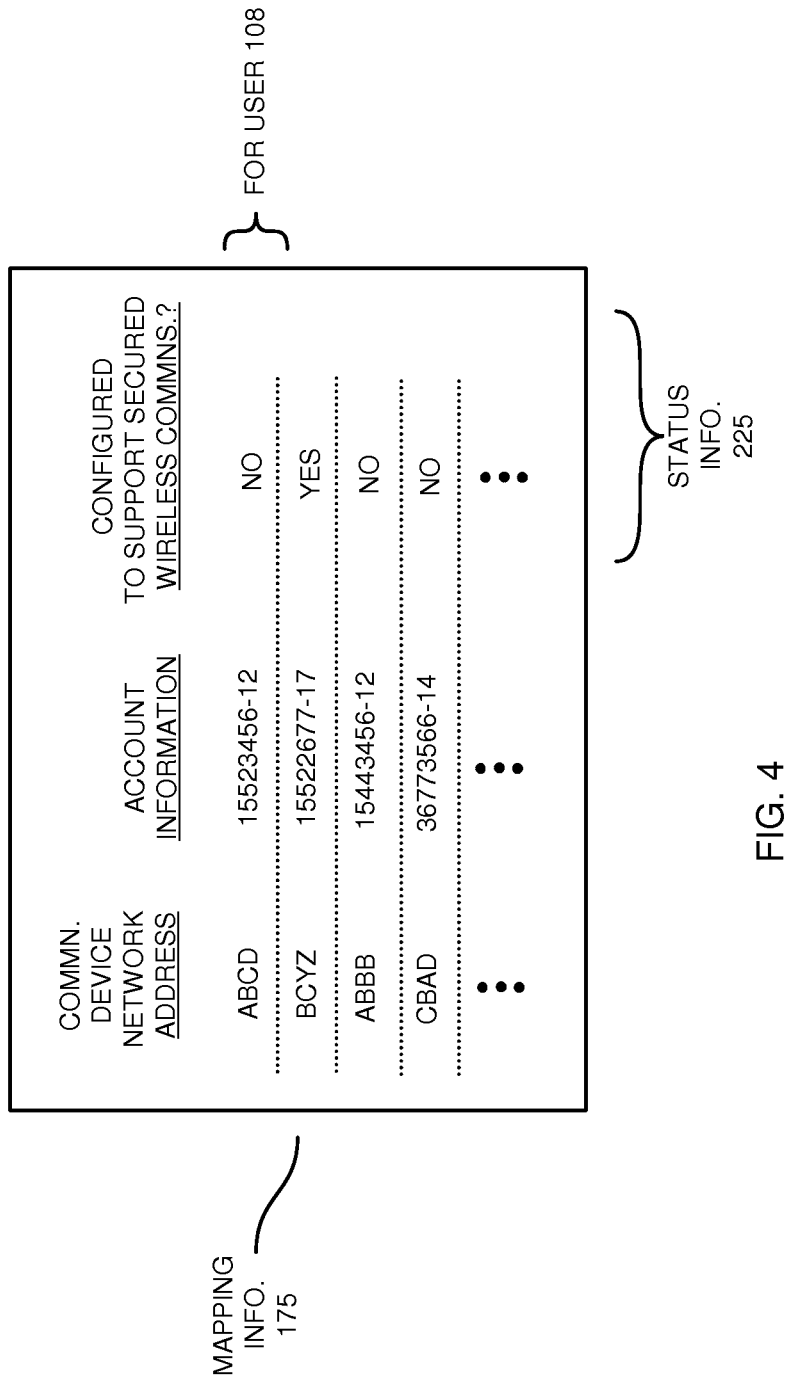
FIG. 4 is an example diagram illustrating mapping information indicating associations between communication devices and corresponding subscriber account information according to embodiments herein.

FIG. 4 is an example diagram illustrating mapping information according to embodiments herein.

As shown, the provisioning resource 155 produces a corresponding entry for user 108 to indicate an association between the MAC network address ABCD assigned to communication device 110 and the corresponding account information 15523456-12 associated with user 108. In other words, via auto-correlation as described herein, the entry for user 108 in mapping information 175 indicates that the communication device 110 assigned MAC network address ABCD is used by user 108 assigned account information 15523456-12.

In one embodiment, when creating a corresponding entry for a newly detected communication device used in a subscriber domain, the provisioning resource 155 produces respective status information indicating whether the newly detected device has been configured to support a wireless communication protocol such as EAP (Extensible Authentication Protocol). Accordingly, embodiments herein can include producing status information 225 indicating whether a respective communication device has been configured to support communications with the wireless access point in accordance with a particular wireless security protocol. After a respective communication device has been configured, the service provider updates the subscriber information 225 in configuration information 175 to reflect any change in status.

Referring again to FIG. 1, any or all of the resources (such as gateway resource 115, server resource 120, controller resource 125, aggregator resource 135, correlator resource 140, account information manager 160, provisioning resource 155, etc.) can be controlled and/or managed by the service provider (such as a cable network service provider) providing the user 108 access under a corresponding network access plan. Among other reasons as discussed herein, correlation of the communication device 110 to respective subscriber account information is useful because there is no need for the subscriber to manually register a respective communication device with the service provider for use in accessing network 190-1. Instead, the service provider is able to determine a correlation based on information collected and forwarded from one or more resources in network environment 100.

Via mapping information 175, the respective service provider or other suitable entity is able to quickly determine, based on a network address assigned to a respective communication device, whether the communication device should be permitted use of a community wireless access points 805 operated by the service provider to access network 190-1. Additionally, the mapping information 175 enables a respective inquiring entity to quickly determine information such as account information, status information 225, etc., associated with the corresponding communication device operated by a subscriber.

More specifically, referring again to FIG. 1, assume that the user terminates wireless communication link 128-1 and moves outside of subscriber domain 150-1 to a public location in which any of multiple subscribers (of the service provider) are able to access network 190-1 via any of community access points 805. Assume that the user 108 operates the controllable device 110 to access network 190-1 through access point 805-1. In such an instance, when establishing the new wireless communication link with access point 805-1, the communication device 110 forwards a MAC network address ABCD of the communication device 110 to the access point 805-1 operated by the service provider. Because the communication device 110 already has been correlated with corresponding subscriber information as indicated by mapping information 175, the service provider immediately (potentially without the user 108 having to porv further credentials) provides the user 108 operating communication device 110 access to network 190-1.

Figure 5:
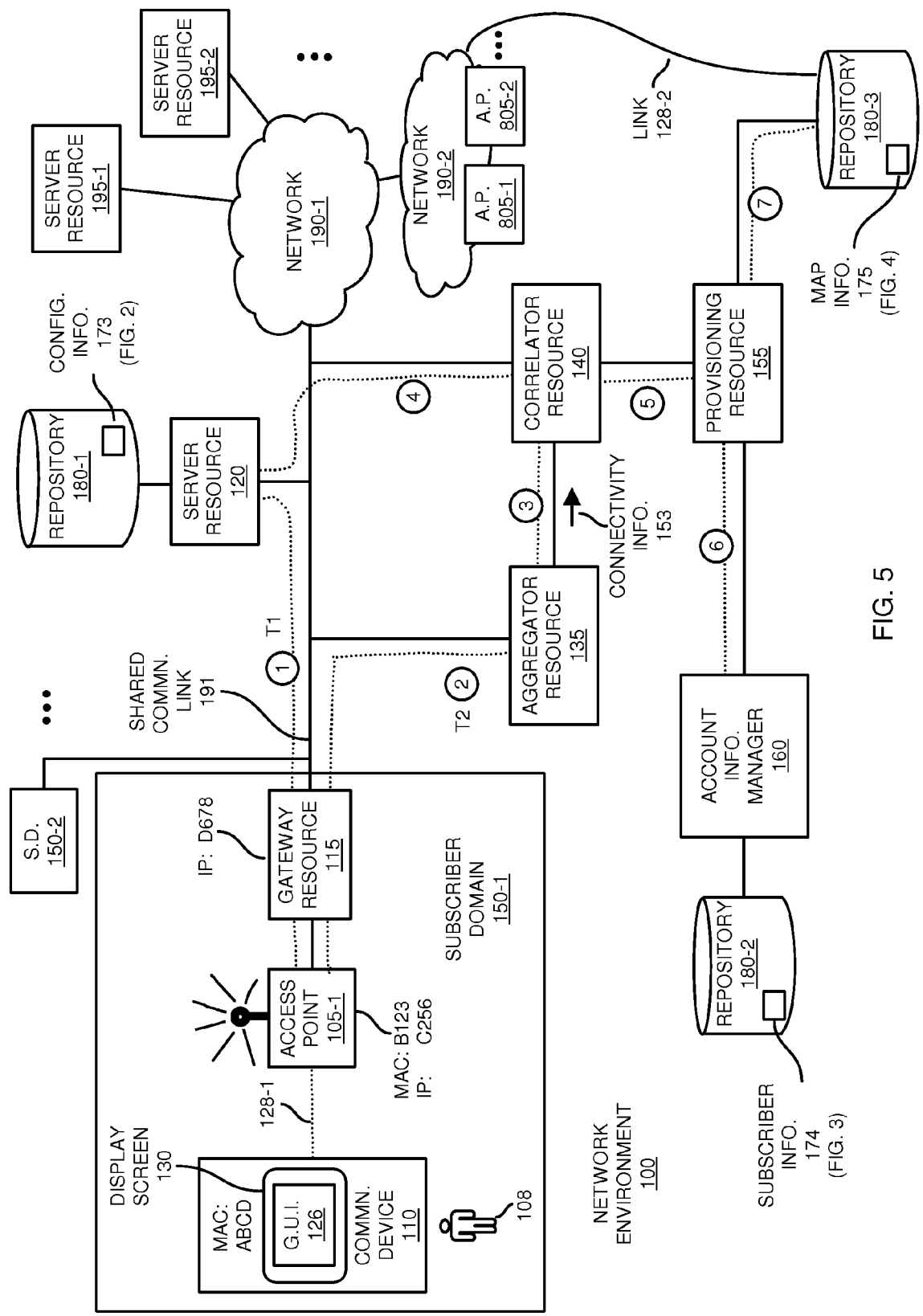
FIG. 5 is an example diagram illustrating correlation of resources in a network environment managed by a service provider according to embodiments herein.

FIG. 5 is an example diagram illustrating correlation of resources in a network environment according to embodiments herein.

In this example, the network environment 100 does not include the controller resource 125 (WiFi™ controller) as previously discussed with respect to FIG. 1. As shown in FIG. 5, the wireless access point 105-1 exports connectivity information such as the MAC network address ABCD, MAC network address B123, and IP network address C256, etc., to directly to aggregator resource 135.

In one embodiment, the wireless access point exports the information via use of SNMP (Simple Network Management Protocol), although any method is suitable for forwarding information to aggregator resource 135.

Operation of correlating the subscriber account information to the communication device 110 is performed in a similar manner as previously discussed.

Figure 6:
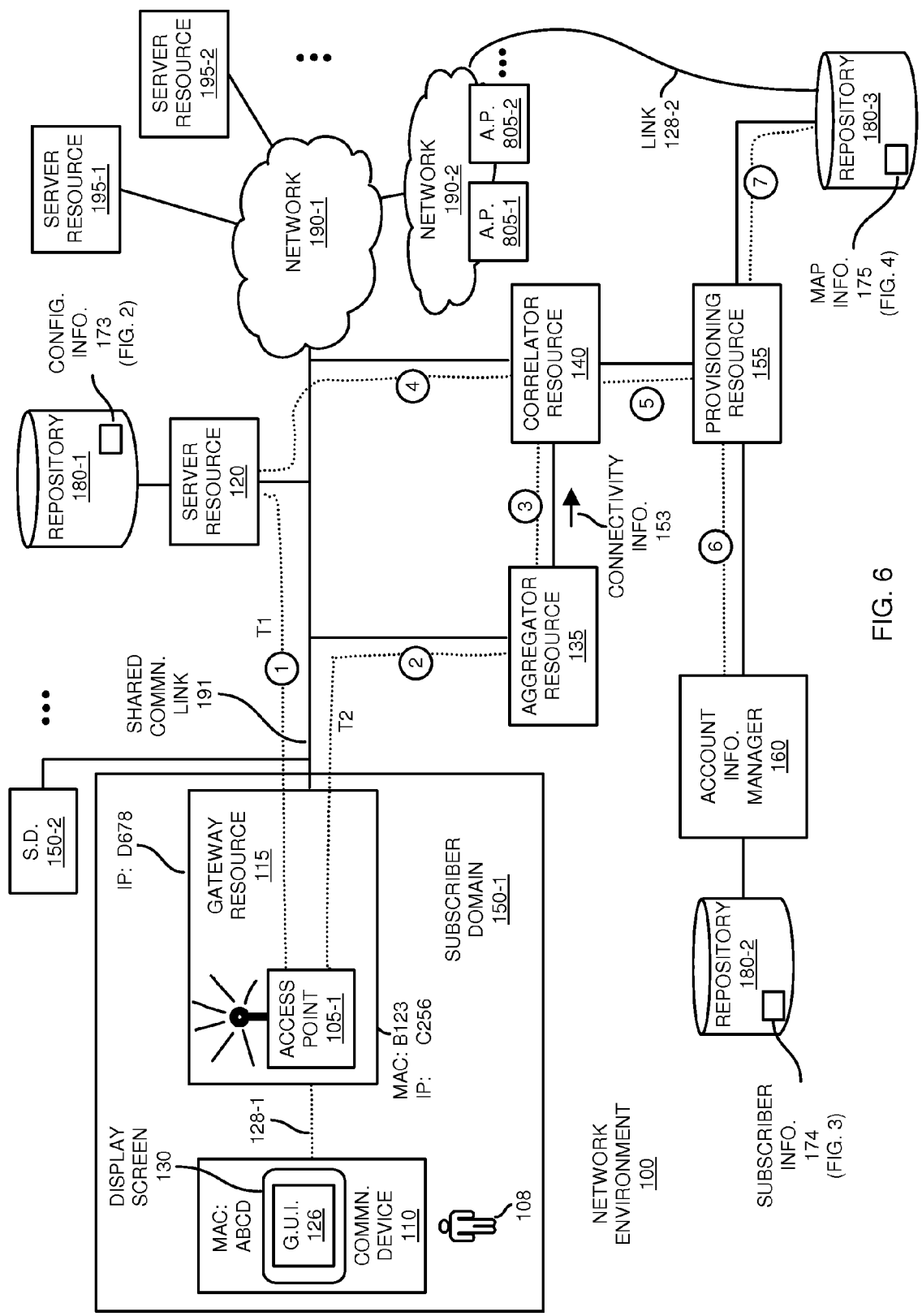
FIG. 6 is an example diagram illustrating correlation of resources in a network environment according to embodiments herein.

FIG. 6 is an example diagram illustrating a network environment and correlation of resources in a network environment managed by a service provider according to embodiments herein. In general, this example embodiment is the same as the embodiment as shown in FIG. 5, except the access point 105-1 is integrated into the gateway resource 115.

Figure 7:
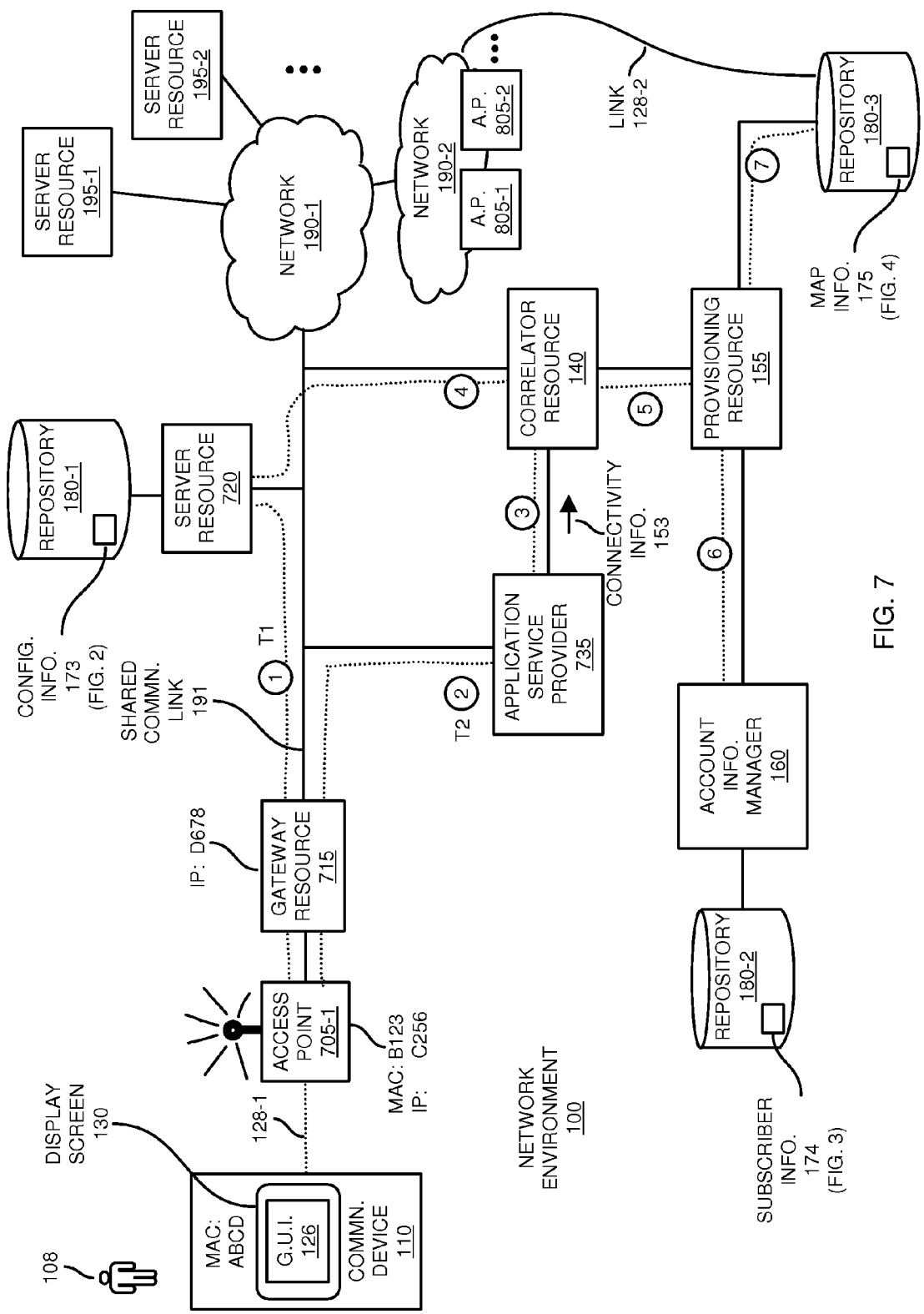
FIG. 7 is an example diagram illustrating correlation of resources in a network environment that is not managed by a service provider according to embodiments herein.

FIG. 7 is an example diagram illustrating correlation of resources in a network environment that is not managed by a service provider according to embodiments herein.

In this example embodiment, the resources including access point 705-1, gateway resource 715, and application service provider 735 are not managed by a corresponding service provider to which the user 108 subscribes to access network 190-1.

In a similar manner as previously discussed, the server resource 720 allocates IP network address C256 for use by access point 705-1. User 108 operates communication device 110 to access application service provider 735. In one embodiment, as its name suggests, the application service provider 735 enables the user operating communication device 110 to retrieve one or more applications for execution on communication device 110.

As previously discussed, via communications from access point 705-1, the application service provider 735 receives and forwards connectivity information 153 (e.g., MAC network address ABCD, IP network address C256, and timestamp information) to correlator resource 140 managed by the service provider.

Thus, in this example embodiment, the correlator resource 140 receives the connectivity information 153 from application service provider 735. By way of non-limiting example, the application service provider (such as a third party entity) can operate independently of a cable network service provider that provides user (operator) of the communication device 110 access to the network 190-1. In a manner as previously discussed, the correlator resource 140 and provisioning resource 155 generate corresponding mapping information 175 associating the communication device 110 to subscriber account information associated with user 108.

Figure 8:
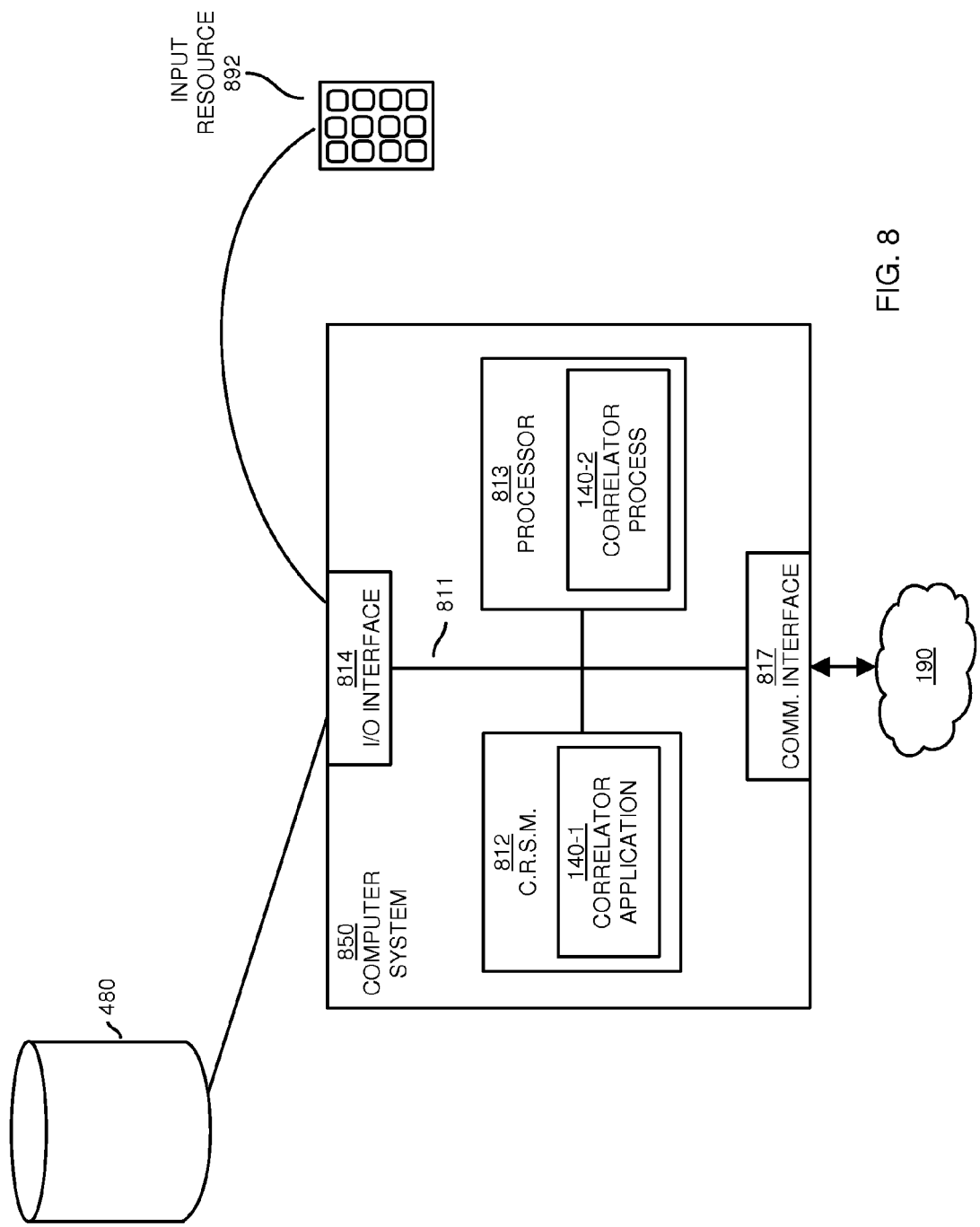
FIG. 8 is an example diagram illustrating a computer system to carry out operations according to embodiments herein.

FIG. 8 is a diagram illustrating an example computer architecture in which to execute any of the functionality according to embodiments herein. Any of the different processing techniques can be implemented via execution of software code on computer processor hardware.

For example, as shown, computer system 850 (e.g., computer processor hardware) of the present example can include an interconnect 811 that couples computer readable storage media 812 such as a non-transitory type of media (i.e., any type of hardware storage medium) in which digital information can be stored and retrieved. The computer system 850 can further include processor 813 (i.e., computer processor hardware such as one or more processor co-located or disparately located processor devices), I/O interface 814, communications interface 817, etc.

Computer processor hardware (i.e., processor 813) can be located in a single location or can represent multiple resources be distributed amongst multiple locations in network environment 100.

As its name suggests, I/O interface 814 provides connectivity to resources such as repository 480, control devices (such as controller 892), one or more display screens, etc.

Computer readable storage medium 812 can be any hardware storage device to store data such as memory, optical storage, hard drive, floppy disk, etc. In one embodiment, the computer readable storage medium 812 stores instructions and/or data.

Communications interface 817 (such as communication portal 160-1) enables the computer system 850 and processor resource 813 to communicate over a resource such as a network 190. I/O interface 814 enables processor resource 813 to access data from a local or remote location, control a respective display screen, receive input, etc.

As shown, computer readable storage media 812 can be encoded with correlator application 140-1 (e.g., software, firmware, etc.) executed by processor 513. Correlator application 140-1 can be configured to include instructions to implement any of the processing operations as discussed herein.

During operation of one embodiment, processor 813 accesses computer readable storage media 812 via the use of interconnect 811 in order to launch, run, execute, interpret or otherwise perform the instructions in correlator application 140-1 stored on computer readable storage medium 812.

Execution of the correlator application 140-1 produces processing functionality such as correlator process 140-2 in processor resource 813. In other words, the correlator process 140-2 associated with processor resource 813 represents one or more aspects of executing correlator application 140-1 within or upon the processor resource 813 in the computer system 850.

Those skilled in the art will understand that the computer system 850 can include other processes and/or software and hardware components, such as an operating system that controls allocation and use of hardware resources to execute correlator application 140-1.

In accordance with different embodiments, note that computer system may be any of various types of devices, including, but not limited to, a set-top box, access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, etc., or in general any type of computing or electronic device.

The computer system 850 may reside at any location or multiple locations in network environment 100. The computer system 850 can be included in any suitable resource in network environment 100 to implement functionality as discussed herein.

Functionality supported by the different resources will now be discussed via flowcharts in FIGS. 9 and 10. Note that the steps in the flowcharts below can be executed in any suitable order.

Figure 9:
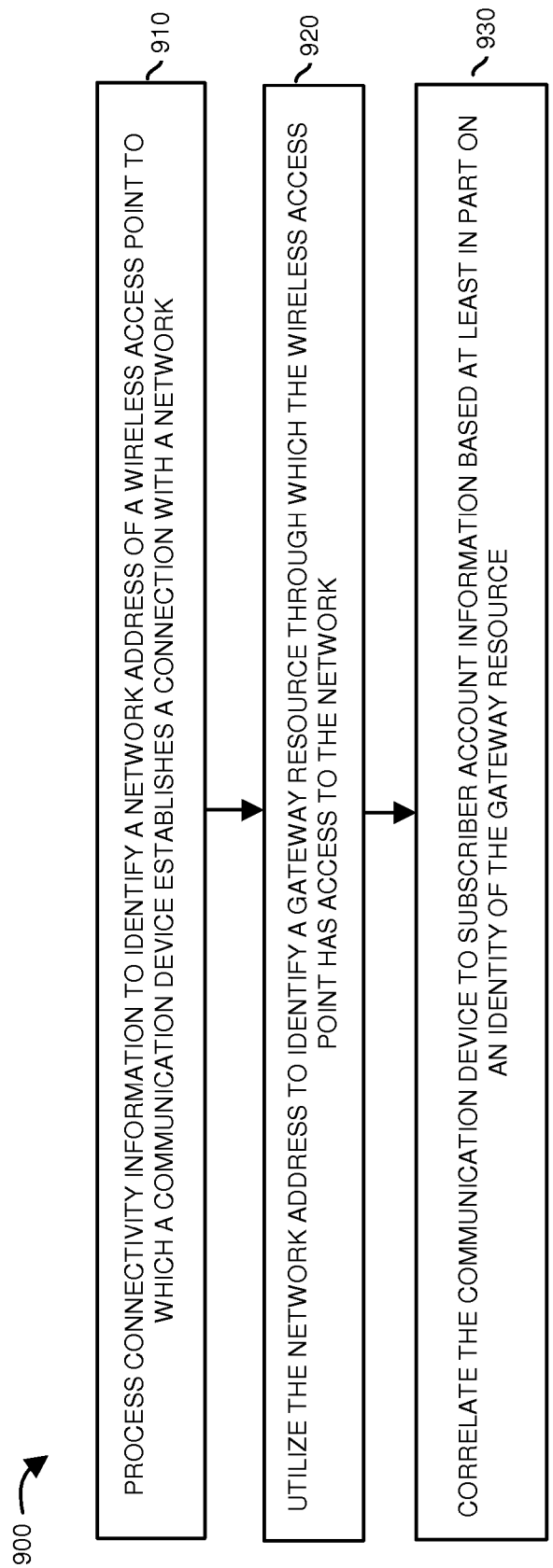
FIG. 9 is an example diagram illustrating a method of correlating communication devices to subscriber information according to embodiments herein.

FIG. 9 is a flowchart 900 illustrating an example method according to embodiments. Note that there will be some overlap with respect to concepts as discussed above.

In processing block 910, correlator resource 140 processes received connectivity information 153 to identify a network address (such as MAC network address B123 or IP network address C256) of a wireless access point 105-1 to which a communication device 110 establishes a connection with network 190-1.

In processing block 920, correlator resource 140 utilizes the network address to identify a gateway resource 115 through which the wireless access point 105-1 has access to the network 190-1.

In processing block 930, the correlator resource 140 initiates correlating the communication device 110 to subscriber account information (15523456-12) based at least in part on an identity (IP network address D678) of the gateway resource 115.

Figure 10:
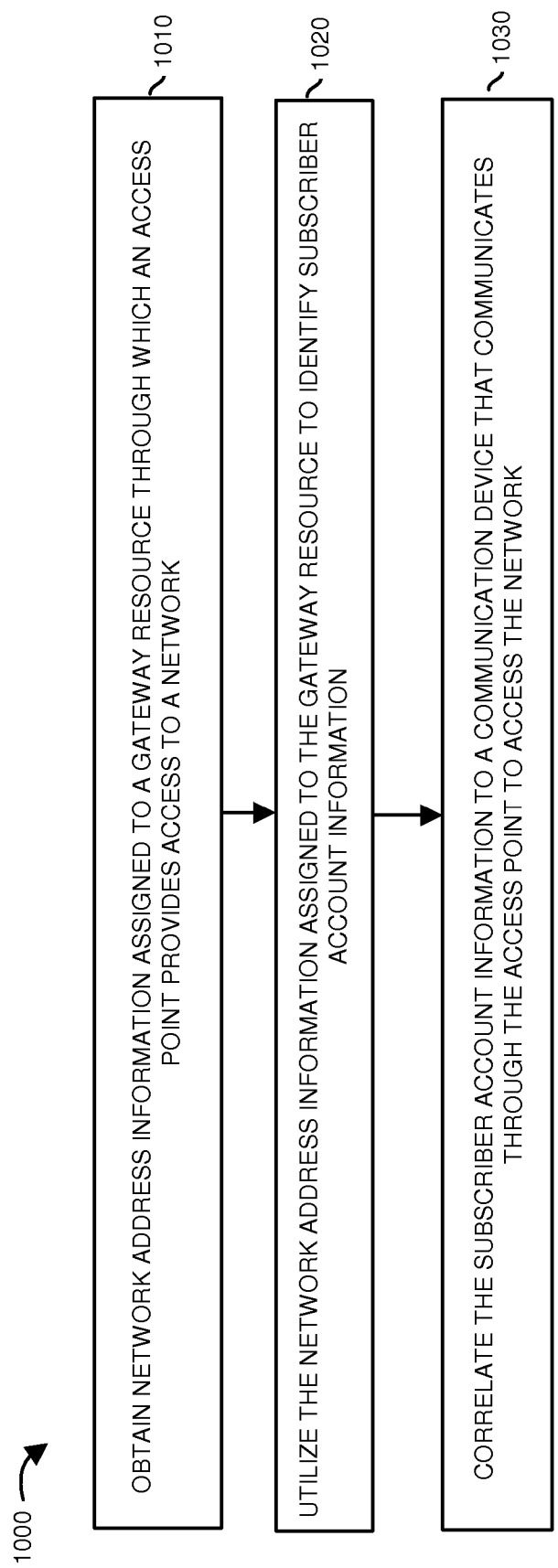
FIG. 10 is an example diagram illustrating a method of correlating communication devices to subscriber information according to embodiments herein.

FIG. 10 is a flowchart 1000 illustrating an example method according to embodiments. Note that there will be some overlap with respect to concepts as discussed above.

In processing block 1010, the correlator resource 140 obtains network address information assigned to gateway resource 115 through which access point 105-1 provides access to a network 190-1.

In processing block 1020, the provisioning resource 155 utilizes the network address information assigned to the gateway resource 115 to identify subscriber account information 15523456-12 associated with user 108.

In processing block 1030, the correlator resource 140 correlates the subscriber account information 15523456-12 to newly detected communication device 110 that communicates through the access point 105-1 to access the network 190-1.

Note again that techniques herein are well suited for correlating a communication device to respective account information of a user operating the communication device. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    via processing hardware, performing operations of:
        processing connectivity information to identify a network address of a first wireless access point to which a communication device establishes a connection with a network;
        retrieving an identity of a gateway resource through which the first wireless access point has access to the network;
        utilizing the identity of the gateway resource to retrieve subscriber account information assigned to an operator of the communication device;
        producing map information correlating a unique identity of the communication device to the subscriber account information;
        utilizing the map information to control subsequent access by the communication device through a second wireless access point to the network, the second wireless access point disparately located with respect to the first wireless access point; and
        wherein retrieving the identity of the gateway resource further comprises: i) forwarding the network address of the first wireless access point to a server resource, the server resource tracking configuration information indicating installation of the first wireless access point in a subscriber domain in which the gateway resource resides; and ii) in response to forwarding the network address of the first wireless access point, receiving the identity of the gateway resource from the server resource.

2. The method as in claim 1, wherein the gateway resource is a modem disposed in the subscriber domain in which an operator of the communication device resides; and
    wherein the first wireless access point is disposed in the subscriber domain.

3. The method as in claim 1, wherein producing the map information includes:
    processing the connectivity information to obtain a network address assigned to the communication device; and
    associating the network address of the communication device to the subscriber account information.

4. The method as in claim 1, wherein the configuration information indicates an association between the first wireless access point and the gateway resource, the association mapping the network address of the first wireless access point to a network address assigned to the gateway resource.

5. The method as in claim 4, wherein the server resource stores the configuration information as a result of allocation of the network address to the first wireless access point, the configuration information generated at a first instance in time upon installation of the first wireless access point in the subscriber domain in which an operator of the communication device resides; and
    wherein the first wireless access point forwards the connectivity information subsequent to allocation of the network address to the first wireless access point, the connectivity information generated at a second instance in time subsequent to the first instance in time.

6. The method as in claim 1 further comprising:
    producing status information indicating whether the communication device has been configured to support communications with the first wireless access point in accordance with a particular wireless security protocol.

7. The method as in claim 1, wherein the first wireless access point originates and exports the connectivity information.

8. The method as in claim 1 further comprising:
receiving the connectivity information from an application service provider, the application service provider operating independently of a cable network service provider that provides an operator of the communication device access to the network, the subscriber account information produced by the cable network service provider for the operator.

9. The method as in claim 1, wherein the communication path is a first communication path, the method further comprising:
receiving the connectivity information over a second communication path, the connectivity information generated by a first wireless access point providing the communication device access to the network through the gateway resource, the connectivity information including the network address of the first wireless access point and the unique identity of the communication device.

10. The method as in declaim 9, wherein utilizing the identity of the gateway resource to retrieve subscriber account information assigned to the operator of the communication device further comprises:
transmitting a query to an account information manager, the query to the account manager including the identity of the gateway resource, the account information manager mapping the gateway resource to the subscriber account information; and
receiving a response from the account information manager, the response including the subscriber account information.

11. The method as in claim 10, wherein utilizing the map to control subsequent access by the communication device through the second wireless access point further comprises:
detecting subsequent use of the communication device to access the network via the second wireless access point;
utilizing the map information to map the unique identity of the communication device to the subscriber account information of the communication device; and
controlling use of the second wireless access point by the communication device in accordance with the subscriber account information.

12. The method as in claim 11, wherein the server resource stores the configuration information as a result of allocation of the network address to the first wireless access point, the configuration information generated at a first instance in time upon installation of the first wireless access point in the subscriber domain in which an operator of the communication device resides; and
wherein the connectivity information is forwarded over the second communication path subsequent to assignment of the network address to the first wireless access point, the connectivity information generated at a second instance in time subsequent to the first instance in time.

13. A method comprising:
via processing hardware, performing operations of:
obtaining network address information assigned to a gateway resource through which a first wireless access point provides access to a network;
wherein obtaining the network address information assigned to the gateway resource includes: i) forwarding a network address of the first wireless access point to a server resource, the server resource tracking configuration information indicating installation of the first wireless access point in a subscriber domain in which the gateway resource resides; and ii) in response to forwarding the network address of the first wireless access point, receiving the network address information assigned to the gateway resource from the server resource;
the method further comprising;
utilizing the network address information assigned to the gateway resource to identify subscriber account information;
producing a map correlating the subscriber account information to a communication device that communicates through the first wireless access point to access the network; and
utilizing the map to control subsequent access by the communication device through a second wireless access point disparately located with respect to the first wireless access point.

14. The method as in claim 13, wherein correlating the subscriber account information to the communication device includes:
receiving a network address assigned to the communication device; and
creating an association between the network address assigned to the communication device and the subscriber account information.

15. The method as in claim 13, wherein the gateway resource is a modem resource allocated by a network service provider for use by an operator of the communication device to access the network.

16. The method as in claim 15, wherein the network service provider assigns the subscriber account information to the operator of the communication device.

17. A system comprising:
computer processor hardware; and
a hardware storage resource coupled to communicate with the computer processor hardware, the hardware storage resource storing instructions that, when executed by the computer processor hardware, cause the computer processor hardware to perform operations of:
processing connectivity information to identify a network address of a first wireless access point to which a communication device establishes a connection with a network;
utilizing the network address to identify a gateway resource through which the wireless access point has access to the network;
wherein utilizing the network address to identify the gateway resource further comprises: i) forwarding the network address of the first wireless access point to a server resource, the server resource tracking configuration information indicating installation of the first wireless access point in a subscriber domain in which the gateway resource resides; and ii) in response to forwarding the network address of the first wireless access point, receiving the identity of the gateway resource from the server resource; and
the method further comprising;
producing map information correlating the communication device to subscriber account information based at least in part on the identity of the gateway resource; and utilizing the map information to control subsequent access by the communication device through a second wireless access point disparately located with respect to the first wireless access point.

18. The computer system as in claim 17, wherein the server resource keeps track of configuration information indicating an association between the first wireless access point and the gateway resource, the association mapping the network address of the first wireless access point to a network address assigned to the gateway resource.

19. The computer system as in claim 17, wherein the computer processor hardware further performs operations of:
producing status information indicating whether the communication device has been configured to support communications with the first wireless access point in accordance with a particular wireless security protocol.

20. The computer system as in claim 17, wherein the computer processor hardware further performs operations of:
receiving the connectivity information from an application service provider, the application service provider operating independently of a cable network service provider that provides an operator of the communication device access to the network, the subscriber account information produced by the cable network service provider for the operator.

21. A system comprising:
computer processor hardware; and
a hardware storage resource coupled to communicate with the computer processor hardware, the hardware storage resource storing instructions that, when executed by the computer processor hardware, cause the computer processor hardware to perform operations of:
obtaining network address information assigned to a gateway resource through which a first wireless access point provides access to a network;
utilizing the network address information assigned to the gateway resource to identify subscriber account information;
wherein obtaining network address information assigned to the gateway resource further comprises: i) forwarding the network address of the first wireless access point to a server resource, the server resource tracking configuration information indicating installation of the first wireless access point in a subscriber domain in which the gateway resource resides; and ii) in response to forwarding the network address of the first wireless access point, receiving the identity of the gateway resource from the server resource; and
producing map information correlating the subscriber account information to a communication device that communicates through the first wireless access point to access the network;
utilizing the map information to control subsequent access by the communication device through a second wireless access point disparately located with respect to the first wireless access point.

22. The computer system as in claim 21, wherein correlating the subscriber account information to the communication device includes:
receiving a network address assigned to the communication device; and
creating an association between the network address assigned to the communication device and the subscriber account information.

23. The computer system as in claim 21, wherein the gateway resource is a modem resource allocated by a network service provider for use by an operator of the communication device to access the network.

24. The computer system as in claim 23, wherein the network service provider assigns the subscriber account information to the operator of the communication device.

25. Computer-readable storage hardware having instructions stored thereon, the instructions, when carried out by computer processor hardware, causing the computer processor hardware to perform operations of:
processing connectivity information to identify a network address of a first wireless access point to which a communication device establishes a connection with a network;
utilizing the network address to identify a gateway resource through which the first wireless access point has access to the network; and
wherein utilizing the network address of the first wireless access point to identify the gateway resource further comprises: i) forwarding the network address of the first wireless access point to a server resource, the server resource tracking configuration information indicating installation of the first wireless access point in a subscriber domain in which the gateway resource resides; and ii) in response to forwarding the network address of the first wireless access point, receiving the identity of the gateway resource from the server resource; and
producing map information correlating the communication device to subscriber account information based at least in part on an identity of the gateway resource; and
utilizing the map information to control subsequent access by the communication device through a second wireless access point disparately located with respect to the first wireless access point.

* * * * *